Figure 1:
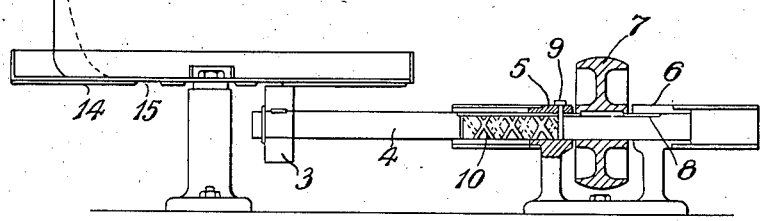

Aug. 13, 1935.   E. A. MURPHY ET AL   2,010,878
METHOD AND APPARATUS FOR COLLECTING CONTINUOUS
LENGTHS OF MATERIAL SUCH AS RUBBER THREAD
Filed Dec. 23, 1931

Edward Arthur Murphy
Walter George Gorham
INVENTORS by Hanna & Rauber
their attorneys Patented Aug. 13, 1935

2,010,878

UNITED STATES PATENT OFFICE 2,010,878

METHOD AND APPARATUS FOR COLLECTING CONTINUOUS LENGTHS OF MATERIAL SUCH AS RUBBER THREAD

Edward Arthur Murphy and Walter George Gorham, Erdington, Birmingham, England, assignors to Dunlop Rubber Company, Limited, Erdington, England, a British corporation Application December 23, 1931, Serial No. 582,768
In Great Britain January 1, 1931

13 Claims. (Cl. 18—8)

This invention concerns improvements in or relating to a method and apparatus for collecting continuous lengths of material, and will be described in its application to the collection of rubber thread.

A number of threads or tubes are frequently formed and continuously treated at the same time, each thread or tube following a predetermined path through various processes in parallel relation to its neighbour.

On arrival at the end of the process or processes the threads require collection simultaneously for transference to another place or to await a subsequent process, this being frequently performed by coiling them in superimposed layers on a drum, so as to economize in space.

In collecting rubber threads or tubes, such for instance as are obtained from natural or artificial dispersions of rubber, there is a tendency for the thread, if uncured, to be deformed if stressed by being lifted onto a drum and also a tendency for such threads to adhere mutually to one another, owing to the comparatively large areas of contact between surfaces which are coiled together in close and continuous contact, and to the natural adhesiveness of uncured rubber.

The object of the present invention is to provide a method and apparatus whereby lengths of material, in particular adhesive material such as rubber thread, may be collected and also distributed at the same time during their collection over the greater part of the area presented by the collecting surface.

Another object of the invention is to effect the collection in such a manner that the tension imparted to the material is reduced to a negligible degree and cannot subsequently develop.

Another characteristic of the invention is to obtain a more even distribution and consequent improvement in penetration of heat through the material which is particularly advantageous where this is subjected subsequently to drying or vulcanization processes.

According to this invention we provide the method of collecting lengths of material such as rubber thread upon a tray rotated by driving mechanism about a fixed centre in which the material is distributed by varying the speed of rotation of the tray, the variations in the speed of the tray being nonrecurrent so that the material is coiled in a plurality of noncoincident figures, the mechanism preferably comprising a revolving member transmitting rotation to the tray through a slipping drive, as for instance through a friction wheel reciprocated in transverse contact therewith along a shaft having intersecting threads.

In order that the said invention may be clearly understood and more readily carried into effect, the same will now be described more fully with reference to the accompanying drawing, in which:—

Figure 2:
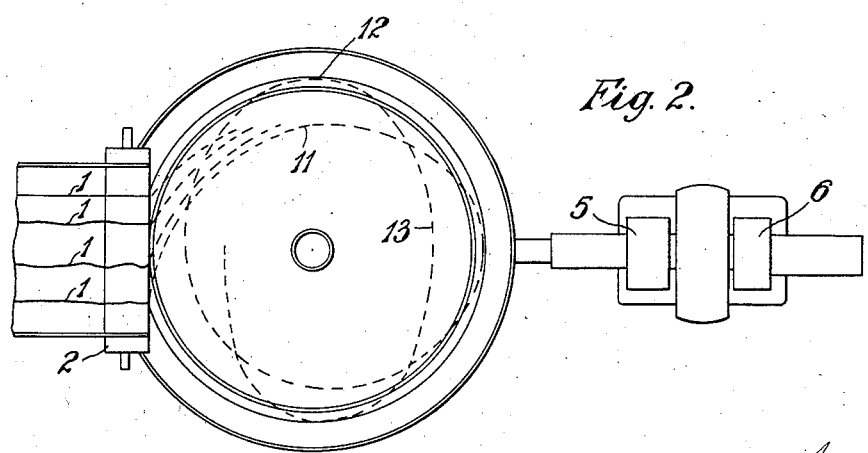

Fig. 1 is a part sectional side elevation of apparatus for carrying out the invention and Fig. 2 is a plan view of the apparatus and disposition of the threads in the collecting tray in accordance with the invention.

The threads to be collected shown at 1 are fed from a previous process by a conveyor or otherwise to a roller 2 which is disposed above the tray at a height sufficient to allow the ends of the threads to be swayed by movement of the tray without causing an undue corresponding displacement where they leave the edge of the roller.

Now if the tray is rotated at a constant speed equal to that of the falling thread, the threads 1 will fall vertically as indicated by the continuous line 1 in Fig. 1, and will be collected in superposed circles as indicated by the continuous lines in Fig. 2, this giving a tendency as the pile 2 grows deeper for those threads in the under layers to be compressed between adjacent threads and to cause their mutual adherence and also to require unnecessary stresses in separation when the threads are unwound for further operations subsequently.

A variation in the speed of rotation of the tray is therefore arranged by turning the tray through the contact with its under surface of a revolving member in the form of a friction wheel 3 Fig. 1, this wheel being secured to a shaft 4 which is free to move transversely or radially of the tray in a pair of bearings 5 and 6.

The shaft is rotated by a pulley or gear wheel 7 keyed to the shaft in a longitudinal keyway 8 so that the shaft may move independently of the pulley 7 which is positioned between the bearings 5 and 6.

The inward and outward movement of the shaft and friction wheel 3 is obtained by a key 9 which may conveniently be incorporated in the bearing 6 passing through the outer surface thereof and seating in an endless helical groove 10 intersecting the keyway 8.

Rotation of the pulley 7 thus causes the friction wheel 5 to rotate and also to reciprocate transversely of the tray in a radial or transverse direction thereto.

When the friction wheel 3 moves to the centre of the tray the tray is rotated at a greater speed than when the friction wheel is adjacent the periphery.

When the tray is rotating at its slowest the threads fall substantially perpendicular to the tray surface as shown by the continuous line in Fig. 1 but at the periods when the speed increases the threads are momentarily swayed from the perpendicular and displaced also towards the centre of the tray being thus connected during the faster period of revolution at a smaller radius than when the tray is rotating at the lower limit of its varying speed.

A certain amount of slip between the driving wheels and the tray is to be preferred, so that the elliptical figures assumed by the deposited threads, due to the varying speed do not recur at exactly the same periods but with certain lag, whereby the falling threads are slightly displaced from those which are coiled on that particular area at the corresponding period of the previous revolution as indicated in Fig. 2.

In this illustration the effect of collecting at constant speed is shown by the continuous lines and of the collection at varying speed by the dotted lines.

The slip may be obtained by allowing the momentum due to the weight of the tray to overrun the friction drive, or may be more positively adjusted or controlled by varying the contour of the under surface of the tray engaged by the friction member as for instance by grooving the under surface 14 or 15 so that the driving wheel 3 momentarily loses contact for a predetermined time.

We may however arrange a slipping clutch in the driving mechanism by means of which the drive is periodically cut off and the tray allowed to overrun for the length of time necessary to displace the coils or to modify their shape.

It will be seen that the threads 1 are swayed towards the centre at the part 11, approach the side edge of the tray at 12, are again swayed inwards at 13 and towards the edge of the tray at a point beneath the roller 2 thereby approximately but not exactly repeating the tract so that successive layers intersect one another and thus build up a structure resembling a honeycomb of easily separable and mutually supporting layers.

The invention may be used in conjunction with the process and apparatus claimed in the application S. N. 309,353 filed September 29, 1928, but it is not limited thereto.

What we claim is—

1. The method of collecting lengths of material, such as rubber thread in distributed positions on a tray, which comprises rotating said tray on a center at a varying speed of rotation and feeding a length of said material onto said tray at a fixed point eccentric to its center of rotation.

2. A method of collecting lengths of filamentary rubber material which comprises rotating a receiving surface in its plane, feeding lengths of said material to said surface eccentrically of its axis of rotation and varying the speed of movement of said surface at the feed point relatively to that of said lengths as said lengths are fed thereto.

3. Apparatus of the type described which comprises a rotating tray, means to feed lengths of material to said tray, at a point eccentric to and in fixed relation to the axis of rotation of said tray, a revolving member transmitting rotation to the tray through a friction drive and cyclicly acting means to vary the driving radius of said friction drive in successive cycles.

4. Apparatus of the type described which comprises a rotating tray, means to feed lengths of material to said tray, at a point eccentric to and in fixed relation to the axis of rotation of said tray, and a revolving member comprising a rotating friction drive for said tray, and means for reciprocating said drive in recurrent cycles transversely relative to said tray.

5. Apparatus of the type described which comprises a rotatable tray, means to feed lengths of material onto said tray, at a point fixed and eccentric to the axis of rotation of the tray, means to rotate said tray and cyclicly acting means to vary the angular velocity of said tray in successive cycles.

6. Apparatus of the type described which comprises a rotatable tray, means to feed a length of material eccentrically onto said tray, at a point fixed relative to the axis of rotation of said tray, means to rotate said tray in recurrent cycles with a varying angular velocity, and means to vary said cycles.

7. Apparatus of the type described which comprises a rotatable tray, means to feed a length of material at a substantially constant rate onto said tray and at a point fixed relative to said tray, means to rotate said tray and means acting cyclicly to vary the angular velocity of said tray.

8. Apparatus of the type described which comprises a rotatable tray, means to feed a length of material to said tray at a point eccentric to the axis of rotation thereof, and means to rotate said tray and to vary the speed of rotation of said tray in successive cycles not exceeding substantially a single rotation of said tray, and independently of the rate and position of feed of said length to vary the relative linear speeds of said length and of the surface of said tray at the point of feeding said length.

9. Apparatus of the type described which comprises a rotatable tray, means to feed a length of material to said tray eccentrically of the axis of rotation thereof, and means to rotate said tray and means to vary the speed of rotation of said tray in cycles, said rotating means and said varying means being so related that said cycles do not substantially exceed a complete rotation of the tray whereby the linear speed of the tray surface varies relative to that of the length of the feed point.

10. A method of collecting a length of material such as rubber thread in distributed positions on a tray which comprises feeding a length of said material to said tray at a point eccentric to the axis of rotation thereof, and varying the angular speed of rotation of said tray independently of the rate and position of feed of said length to vary the relative linear speeds of said length and of the surface of said tray at the point of feeding said length.

11. A method of collecting filamentary material such as rubber thread in distributed positions on a tray which comprises feeding said material to said tray eccentrically of the axis of rotation thereof, rotating said tray, and varying the speed of rotation thereof in cycles not substantially exceeding a complete rotation of the tray to vary the linear speed of the tray surface to that of said filamentary material at the point of feeding.

12. The apparatus of claim 8 in which said variable tray rotating means comprises a friction wheel and means to move said wheel axially independently of said feed means.

13. Apparatus of the type described which comprises a rotating tray, means to feed a length of material to said tray, a revolving member transmitting rotation to the tray through a friction drive, and means to vary the driving radius of said friction drive in successive cycles, said tray driving mechanism and said varying means being so proportioned that said cycles are not substantially greater than that of a complete rotation of said tray.

EDWARD ARTHUR MURPHY.
WALTER GEORGE GORHAM.